(12) United States Patent
Kozat

(10) Patent No.: US 8,396,139 B2
(45) Date of Patent: Mar. 12, 2013

(54) METHOD AND APPARATUS FOR SENDING INFORMATION VIA SILENT SYMBOL CODING OVER UNDER-UTILIZED CHANNELS IN WIRELESS SYSTEMS

(75) Inventor: Ulas C. Kozat, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 391 days.

(21) Appl. No.: 12/782,649

(22) Filed: May 18, 2010

(65) Prior Publication Data

US 2010/0323708 A1 Dec. 23, 2010

Related U.S. Application Data

(60) Provisional application No. 61/219,243, filed on Jun. 22, 2009.

(51) Int. Cl.
*H04L 27/00* (2006.01)
(52) U.S. Cl. .................................. 375/259; 375/340
(58) Field of Classification Search .................. 375/130, 375/259–260, 340, 342, 316; 370/229–230, 370/235, 431, 464, 490, 527, 529; 380/255
See application file for complete search history.

(56) References Cited

U.S. PATENT DOCUMENTS

| 7,710,858 | B1 * | 5/2010 | Cohen | 370/210 |
| 2008/0311873 | A1 * | 12/2008 | Kim et al. | 455/272 |
| 2010/0061223 | A1 * | 3/2010 | Kim et al. | 370/208 |
| 2012/0134431 | A1 * | 5/2012 | Taylor et al. | 375/260 |

OTHER PUBLICATIONS

Shum, Kenneth W., "Permutation Coding and MFSK Modulation for Frequency Selective Channel", 13th International Symposium on Personal, Indoor and Mobile Radio Communications, Sep. 15, 2002, pp. 2063-2066, vol. 5, Piscataway, New Jersery, USA.
Balakirsky, V. B., et al., "Constructions of Specific Permutation Codes for Multi-User Communication", Proceedings of Information Theory, Sep. 2, 2001, pp. 79-81, Cairns, Australia.
PCT International Search Report for corresponding PCT Patent Application No. PCT/US2010/038668, Sep. 20, 2010, 8 pgs.
PCT Written Opinion of the International Searching Authority for corresponding PCT Patent Application No. PCT/US2010/038668, Sep. 20, 2010, 9 pgs.
PCT International Preliminary Report on Patentability for related PCT Patent Application No. PCT/US2010/038668, Jan. 12, 2012, 9 pgs.

* cited by examiner

*Primary Examiner* — Jean B Corrielus
(74) *Attorney, Agent, or Firm* — Blakely, Sokoloff, Taylor & Zafman LLP

(57) ABSTRACT

A method and apparatus is disclosed herein for sending information over under-utilized channels in wireless systems. In one embodiment, a method for use in a cellular system in which a channel allocated to a primary user is underutilized at times, comprises: creating a unique 0-1 valued permutation code to transmit bits of a secondary user on a channel of the primary user; creating one or more codewords based on a first set of symbols to be transmitted for the primary user and the permutation code; and transmitting the one or more codewords on the channel.

19 Claims, 7 Drawing Sheets

METHOD AND APPARATUS FOR SENDING INFORMATION VIA SILENT SYMBOL CODING OVER UNDER-UTILIZED CHANNELS IN WIRELESS SYSTEMS

PRIORITY

The present patent application claims priority to and incorporates by reference the corresponding provisional patent application Ser. No. 61/219,243, titled, "A Method and Apparatus for Sending Information via Silent Symbol Coding over Under-utilized Channels in Wireless Systems," filed on Jun. 22, 2009.

FIELD OF THE INVENTION

The present invention relates to the field of wireless data communication, cellular systems, and coding; more particularly, the present invention relates to sending information via silent symbol coding over under-utilized channels in wireless systems.

BACKGROUND OF THE INVENTION

Broadband wireless systems are typically designed for per cell capacity maximization with some fairness constraints for individual users. Even when the fairness constraints are taken into account, the basic assumption is that the allocated rate can be fully utilized. However, practical systems have limitations in terms of smallest chunks of bandwidth allocation. For instance, in HSDPA systems, the smallest time unit a given channel (e.g., spreading code, frequency band, etc.) dedicated to a particular user (say Alice) is 2 milliseconds long. Suppose B bits are waiting in Alice's transmission queue and Alice's channel quality is such that this smallest unit can deliver W bits, which is strictly more than B bits. Therefore, the system wastes (W−B) bits by either going into an idle mode for the remainder of the time slot or by sending padded bits. Note that the main problem here is that the system cannot reassign the channel to another user and partially reuse since the scheduling decisions are done on a per slot basis in this example.

SUMMARY OF THE INVENTION

A method and apparatus is disclosed herein for sending information over under-utilized channels in wireless systems. In one embodiment, a method for use in a cellular system in which a channel allocated to a primary user is underutilized at times, comprises: creating a unique 0-1 valued permutation code to transmit bits of a secondary user on a channel of the primary user; creating one or more codewords based on a first set of symbols to be transmitted for the primary user and the permutation code; and transmitting the one or more codewords on the channel.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
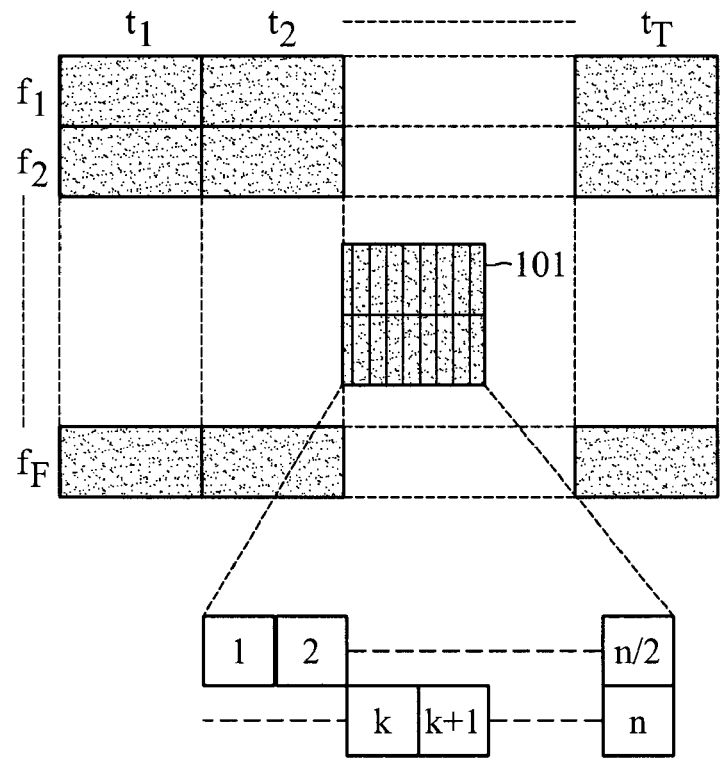
FIG. 1 illustrates, in a typical wireless system, a given base station allocating each of its users a set of channels in the form of frequency bands, time slots, and spreading codes in a scheduling interval.

New techniques are disclosed herein for utilizing partially utilized wireless channel resources to send more information to other users who observe congestion. Embodiments of the invention achieve such utilization by inserting silent symbols between the symbols to be actually transmitted over the partially used wireless channel. The positions of the silent symbols in a resource block carry information to a user other than the user to whom the particular resource block is addressed.

A result of using the techniques disclosed herein is to assist wireless users who do not get enough data rates from the resources allocated to them at a given base station (or equivalently wireless access point or wireless transmitter) by sending them more information over under-utilized resources at the same and/or other base station(s).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In FIG. 1, a wireless system with a scheduling frame of T time slots and F frequency sub-bands is depicted. In a typical wireless system, a given base station allocates each of its users a set of channels in the form of time slots, frequency bands, and spreading codes within a scheduling frame. In FIG. 1, as an illustrative example, the blocks 101 are assigned to a particular user (say Alice) by the base station A. Base station A communicates with Alice by mapping her bit-stream into a non-zero sequence of symbols and sending individual symbols over the allocated resources with each symbol having the same symbol duration $T_{sym}$. Regardless of whether the resource blocks assigned to a user are physically contiguous or not, they can be represented logically as a sequence of symbols with each symbol having a unique location in the source block. For instance, in FIG. 1, the resource blocks assigned to Alice by base station A can be mapped onto n symbol locations. The resource blocks assigned to Alice by base station A are under-utilized if Alice does not have enough number of bits waiting in her transmission queue at base station A. For instance, if base station A is using QPSK modulation at the channel quality Alice is experiencing and base station A has B=500 bits to be transmitted to Alice, k=250 QPSK symbols suffice to send all 500 bits. If n>k, obviously base station A cannot utilize all n symbols. Base station A either keeps silent for the remaining (n−k) symbol duration or send padded bits as null information.

Figure 2A:
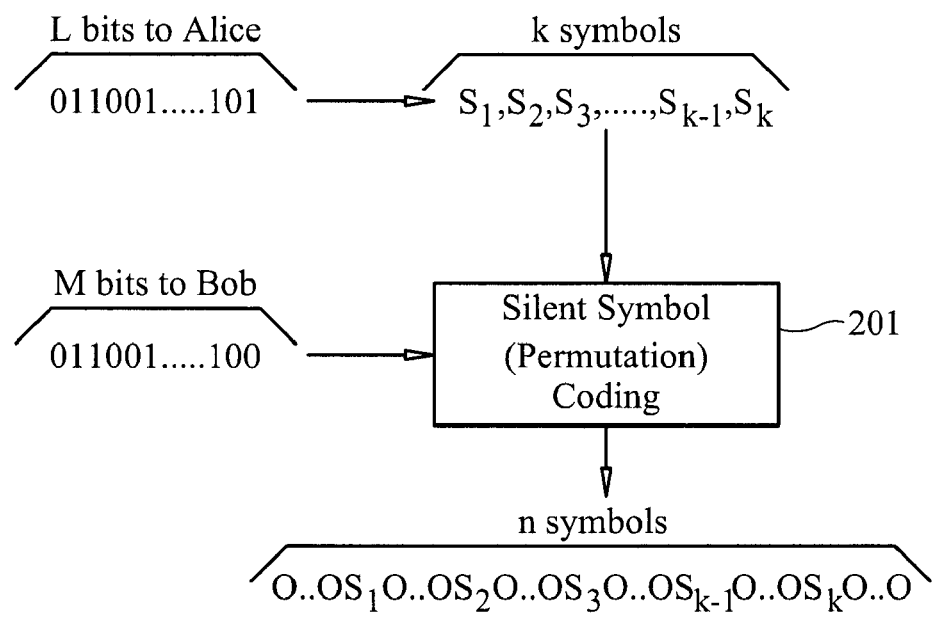
FIG. 2A illustrates the message blocks for Alice (primary user) and Bob (secondary user) being used together to create a permutation of Bob's symbols padded by silent symbols to completely fill the available symbol locations.

In one embodiment, base station A makes a dual assignment for a given set of resource blocks. Each set of resource blocks are first assigned to a primary user. If the set of resource blocks are under-utilized by the primary user, then they are also assigned to a secondary user. The bits of the primary user are mapped onto a sequence of symbols using a constellation with non-zero constellation points (i.e., if S is the constellation and s∈S, then $s^H s > 0$, here $s^H$ is the conjugate transpose of the column vector s). The primary user symbols and the secondary user bits are then used together to determine a unique permutation codeword where silent symbols are inserted before, after, and/or in between the symbols generated from the primary user bits. Base station A transmits the permutation codeword starting from the leftmost symbol: if the next symbol to be transmitted is a silent symbol, base station A does not send anything for the next symbol duration. If the next symbol is not a silent symbol, base station A transmits the signal waveform corresponding to that symbol. FIG. 2A depicts an example of how primary user (Alice) and secondary user (Bob) information bits are combined together to create such a unique permutation codeword using both primary and secondary user bits. That is, the message block for Alice (primary user) and Bob (secondary user) are used together to create a permutation of Bob's symbols padded by silent symbols to completely fill the available symbol locations. Referring to FIG. 2A, L bits that are being sent to Alice are converted into K symbols and M bits being sent to Bob are received by coder 201, which performs a silent symbol (permutation) coding to generate n symbols.

One method of silent symbol coding performed by coder 201 proceeds as follows. When the primary user's resource blocks are fully utilized, the codeword to be transmitted by the base station includes no silent symbol and only the symbols generated from the primary user's bit stream are sent out. In one embodiment, whenever primary user's resource blocks are under-utilized (n>k), the following set of actions is taken:

1. Primary user's message of length L bits waiting in the transmission queue of the base station is mapped onto a bit stream of 0's and 1's. In one embodiment, if the message is in binary format, the mapping operation need only be reading L bits from the primary user's queue.

2. Primary user's bit stream is mapped onto k modulation symbols $s_1, s_2, \ldots, s_k$ based on the current symbol constellation that the base station is using for the primary user as dictated by the channel state information and rate control algorithm being used in the system.

3. The total number n of symbols is used to construct a codeword $CW_0$ where the first k entries are 1's and the rest of the (n−k) entries are all 0's. i.e., $CW_0 = \{w_{01} w_{02} \ldots w_{0n}\}$ with $w_{0i}=1$ for $i=1, \ldots, k$ and $w_{0i}=0$ for $i=(k+1), \ldots, n$.

4. n and k are used to compute $$\Omega = \binom{n}{k} = \frac{n!}{k! \cdot (n-k)!},$$

where $\Omega$ denotes the total number of different unique permutations of the codeword $CW_0$.

5. M bits are fetched from the head of the transmission queue for the secondary user such that the first bit read from the queue is the least significant bit and the M-th bit read from the queue is the most significant bit forming the codeword $CW_1 = \{w_{11} w_{12} \ldots w_{1M}\}$. M can take a value of either $\lfloor \log_2\Omega \rfloor$ or $1+\lfloor \log_2\Omega \rfloor$, where $\lfloor \cdot \rfloor$ denotes the floor operation on its argument. Specifically, in one embodiment, M is equal to $1+\lfloor \log_2\Omega \rfloor$ if the decimal representation of $CW_1$ (denoted as $CW_{1,decimal}$) is less than or equal to $(\Omega-1)$, i.e., $CW_{1,decimal} = w_{11} + 2w_{12} + 2^2 w_{13} + \ldots + 2^{(M-1)} w_{1M} \leq (\Omega-1)$, and $w_{1M}=1$ or $w_{1M}=0$ and $w_{11} + 2w_{12} + 2^2 w_{13} + \ldots + 2^{(M-2)} w_{1(M-1)} + 2^{(M-1)} > (\Omega-1)$. In other words if the most significant bit is zero, replacing it with one should not be another eligible code. Otherwise, M is equal to $\lfloor \log_2\Omega \rfloor$. For purposes herein, $CW_{1,decimal}$ is referred to as the index of $CW_1$ and i is used in place of $CW_{1,decimal}$. The index i takes values in the range $[09, \Omega-1]$ and the set of $CW_1$'s is enumerated as $CW_1(0), CW_1(1), \ldots, CW_1(i), \ldots, CW_1(\Omega-1)$.

6. $CW_1$ constructed in the previous operation is used to generate a unique codeword X by computing a unique permutation of $CW_0$. Uniqueness here implies that two different codeword in the set of $CW_1$ will be mapped to two distinct permutation codes. In one embodiment, the algorithmic operations are as follows:

a. $CW_{1,decimal}$ is computed from $CW_1$ and assigned to i.
   b. i is mapped onto $\tilde{X}(i) = \Omega - 1 - i$ which in return is expanded in a one-to-one fashion into a unique (n−k)-term representation $\{x_{n-k}, x_{n-k-1}, \ldots, x_1\}$ such that $$\tilde{X}(i) = \binom{x_{n-k}}{n-k} + \binom{x_{n-k-1}}{n-k-1} + \ldots + \binom{x_2}{2} + \binom{x_1}{1}$$

and $x_j \geq 0$ for $j=1, \ldots, s$. In one embodiment, the procedure to compute the (n−k) is straightforward by using the following recursive operation:

$x_{n-k}$ is the greatest integer such that $$\binom{x_{n-k}}{n-k} \leq \tilde{X}(i); x_{n-k-1}$$

is the greatest integer such that $$\binom{x_{n-k-1}}{n-k-1} \leq \tilde{X}(i) - \binom{x_{n-k}}{n-k}; \ldots; \binom{x_r}{l}$$

is the greatest integer such that $$\binom{x_r}{l} \leq \tilde{X}(i) - \sum_{j=r+1}^{n-k} \binom{x_j}{j}; \ldots; \binom{x_1}{1}$$

is the greatest integer such that $$\binom{x_1}{1} \leq \tilde{X}(i) - \sum_{j=2}^{n-k} \binom{x_j}{j}.$$

c. The locations $loc_j$ ($j=1, \ldots, n-k$) are computed such that $loc_j = n-1-x_{n-k+1-j}$. Denote the set of $loc_j$'s computed for index i as LOC(i).
   d. Codeword $X = \{x_0, x_1, \ldots, x_{n-1}\}$ is constructed by setting $x_j=0$ if $j \in LOC(i)$ and $x_j=1$ otherwise. In the constructed codeword, 0's represent the silent symbols and 1's represent the actual epochs symbols of the primary user is transmitted. In other words, the base station parses the constructed codeword X from left to right (as long as the orders are consistent, left to right is not a requirement but just a convention); if i-th bit is 0, the transmitter keeps silent for a symbol period, if i-th bit is 1, the transmitter sends the next symbol $s_j$ in the usual order they are supposed to be transmitted. This is equivalent to sending a codeword $CW = \{o \ldots o s_1 o \ldots o s_2 o \ldots o s_j o \ldots o s_k o \ldots o\}$ where the locations of silent symbols "o" are the same as the locations of zeros in X.

The procedure outlined above for encoding an index i to a unique permutation X (and decoding i from a given X) is a well known technique and a more generalized form can be found in Data & McLaughing, "An Enumerative Method for Runlength-limited Codes: Permutation Codes," in IEEE Transactions on Information Theory, vol. 45, no. 6, pp. 2199-2204, 1999. The above enumeration procedure can be replaced by other techniques as long as M bits of the secondary users and k symbols of the primary user can be mapped onto a codeword CW in a one-to-one fashion as depicted in FIG. 2A.

Note that the coding operation may be performed wherever the baseband processing is performed. This may be in a base station, access point or other node in the wireless communication system.

When the base station transmits CW neither the primary nor the secondary users know about the locations of the silent symbols and they both have to identify the locations of the silent symbols correctly in order to decode the permutation code at the secondary user's receiver and to decode the symbols $s_1, s_2, \ldots, s_k$ at the primary user's receiver.

Note that the secondary user knows that data may be sent on the primary user's channel because the base station controller notifies the secondary user when allocating the resources (e.g., channel) to the primary user and tells the both the primary user and the secondary user what coding profile (e.g., permutation coding is enabled or disabled) is to be used. This notification may be performed as part of the profile being provided by the controller to the primary and secondary users.

Figure 2B:
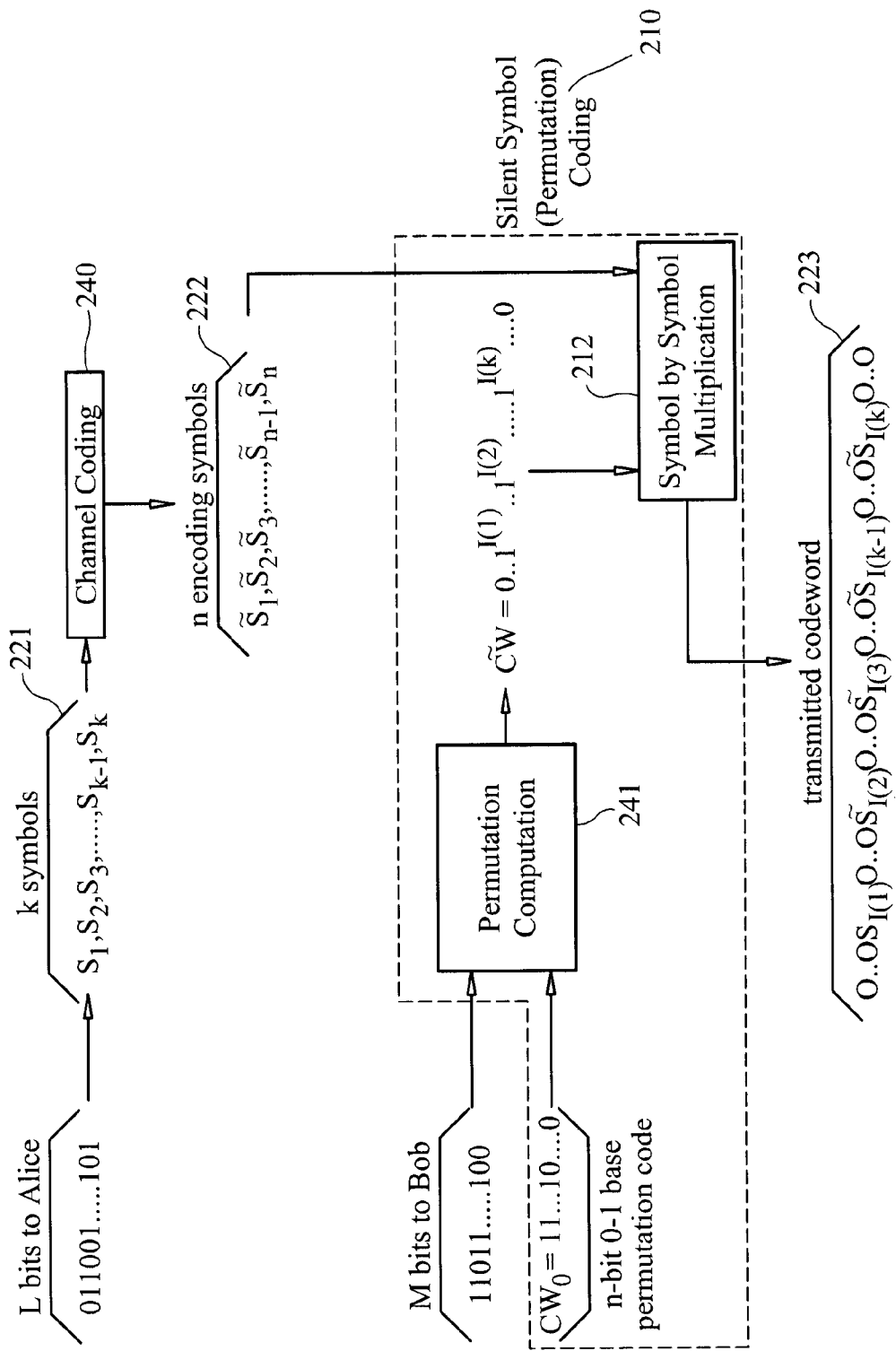
FIG. 2B illustrates an alternative embodiment of a coding arrangement that uses silent symbol coding.

FIG. 2B is an alternative embodiment depicting silent symbol/permutation coding. Referring to FIG. 2B, L bits to Alice are converted into k symbols 221. These are input into channel coder 240 that performs channel coding that produced encoding symbols 222, which are sent to silent symbol (permutation) coding 210. Also, M bits for Bob are input along with an n-bit 0-1 base permutation code into permutation computation block 241. The output of permutation computation block 241 is input with n encoding symbols 222 to multiplier 212, which performs symbol-by-symbol multiplication between the output of permutation computation block 241 and n encoding symbols 222, resulting in transmit codewords 223.

Figure 3:
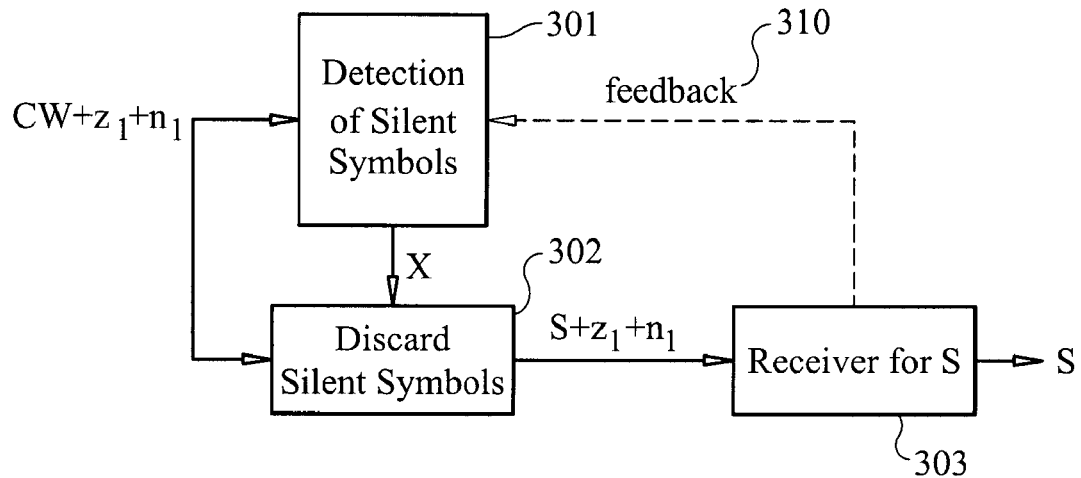
FIG. 3 illustrates a block diagram of high-level actions at a primary user's receiver.

In the following description, the channel gains will be assumed to be known at the receiver and hence the actual values are not important for this disclosure. On the other hand, the transmitters are assumed to know either the channel gains or the channel state information for better pairing of the primary and secondary users. FIG. 3 is a high-level block diagram of a primary user's receiver depicting the sequence of actions taken at the receiver user after converting the received signal to the base-band signal $y=CW+z_1+n_1$. CW denotes the codeword generated at the base station (i.e., sequence of silent symbols interspersed with the actual symbols sent to the primary user), $z_1$ denotes the possible interference from other radio signals over the same resource blocks CW is sent over, and $n_1$ denotes the noise added at the primary user's terminal. The primary user first detects the silent symbol positions in the received signal y using silent symbol detector 301 and hence permutation code X is decoded first. These positions are removed from the received n by 1 vector y by silent symbol remover 302 yielding a new k by 1 vector $y=S+z_1+n_1$, where $S=\{s_1 s_2 \ldots s_k\}$ and $z_1$ as well as $n_1$ are updated interference/noise terms such that dimensions corresponding to the silent epochs in the original vectors are filtered out.

At this point, all the artifacts of permutation coding are removed and the primary user's receiver 303 continues with the usual decoder operations based on the symbol constellation S. The critical operation in this overall procedure is the operation in which the silent symbol positions are identified. One practical way of such identification is to apply symbol by symbol hypothesis testing, which is well-known. Let $y[i]=CW[i]+z_1[i]+n_1[i]$ and $y=\{y[1], y[2], \ldots, y[n]\}$. Denote hypothesis $H_0$ as "CW[i] is a silent symbol" and $H_1$ as "CW[i] is not a silent symbol". In one use case, the identification comprises maximum likelihood (ML) detection as follows:

Decide $H_0$ if $P(Y[i]|CW[i]=o) \geq P(y[i]|CW[i] \neq o)$
Decide $H_1$ otherwise.

Above P(i|j) refers to "probability that i is true given j is true". For purposes herein, when y[i] is a continuous random variable, one should replace P(i|j) with the probability density function (pdf) f(i|j). Note that $P(y[i]|CW[i]=o)=P(z_1[i]+n_1[i])(f(y[i]|CW[i]=o)=f(z_1[i]+n_1[i]))$. When both the interference and the noise term are independent Gaussian random processes, their sum is also Gaussian and $f(z_1[i]+n_1[i])$ simplifies to the pdf of a Gaussian random variable. Similarly, $$P(y[i] | CW[i] \neq o) = \frac{1}{|A|}\sum_{s \in A} P(y[i] | CW[i] = s),$$

provided that each s∈A is equally likely. Assuming the MAP rule instead of ML and using the approximation $P(H_0)=k/n$ (hence $P(H_1)=1-k/n$), another detector would be:

Decide $H_0$ if $P(y[i]|CW[i]=o) \cdot P(H_0) \geq P(y[i]|CW[i] \neq o) \cdot P(H_1)$
Decide $H_1$ otherwise.

The MAP rule requires the knowledge of k at the receiver. After n hypothesis testing, X can be constructed by inserting 0 at the positions where $H_0$ is decided and inserting 1 at the positions where $H_1$ is decided. If k is known at the receiver and hypothesis testing results in more than k 1's, the positions with the k highest likelihood ratios of $(P(y[i]|CW[i] \neq o) \cdot P(H_1))/(P(y[i]|CW[i]=o) \cdot P(H_0))$ are picked as the 1's and the rest of the entries are set to 0's. Finally, the 0 valued positions are filtered out in vector y and the decoding operation continues for $s_j$'s. Note that after/during the decoding of $s_j$'s, the hypothesis testing can be iteratively refined if errors in $s_j$'s are detected (for instance due to checksums).

Feedback 310 may be used to notify silent symbol detector 301 when the detection results has not correctly identified the silent symbols. This may occur if too many or too few symbols are identified.

In an alternative embodiment, the decoding at the primary user may be performed by directly decoding the incoming symbol stream assuming no knowledge of the permutation coding. This can be done since the permutation coding is another type of noise (albeit a multiplicative one like fading coefficients). This is described in more detail below.

Figure 4:
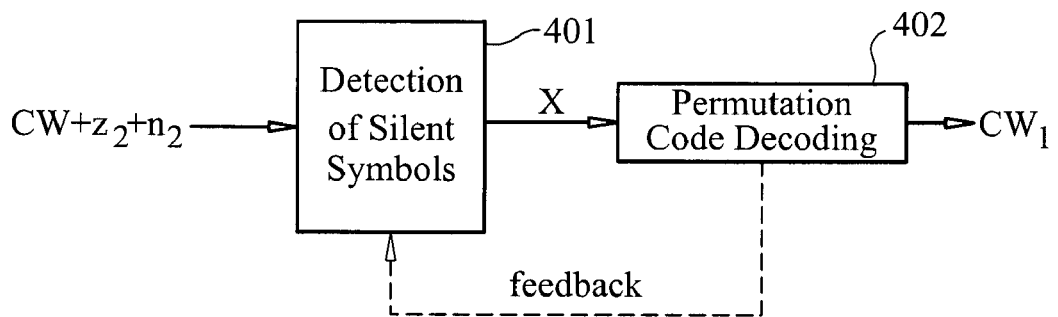
FIG. 4 illustrates a block diagram of high-level actions at a secondary user's receiver.

FIG. 4 is a high-level block diagram of a secondary user's receiver depicting the sequence of actions taken at the receiver after converting the received signal to the base-band signal $y=CW+z_2+n_2$. In this particular case, similar to the primary user, the secondary user first performs silent symbol detection using silent symbol detector 401 through hypothesis testing to construct X. The detection can be symbol by symbol and, in one embodiment, ML or MAP rules are exactly the same as outlined for the primary user but using the statistics of $z_2+n_2$ instead of $z_1+n_1$. Decoder 402 receives and performs permutation code decoding to generate $CW_1$.

As with FIG. 3, feedback may be used.

In the case where both $z_2$ constellation (e.g., when secondary user of base station that transmits CW is a primary user over the same resource blocks at another base station, hence $z_2$ also carries information of this user) and constellation of the CW elements (i.e., each element of CW is either s∈A or s=o) are known, the expressions may be refined as follows:

$$P(y[i] | CW[i] = o) = \frac{1}{|Z_2|}\sum_{z \in Z_2} P(z_2[i] + n_2[i] | z_2[i] = z)$$

$$P(y[i] | CW[i] \neq o) = \frac{1}{|A|}\frac{1}{|Z_2|}\sum_{s \in A}\sum_{z \in Z_2} P(CW[i] + z_2[i] +$$
$$n_2[i] | CW[i]$$
$$= s, z_2[i] = z)$$

Note that the probability expressions in the summation terms are replaceable by the pdf's, and given noise $n_2[i]$ is Gaussian distributed, pdf's can be computed in a closed form.

Figure 5:
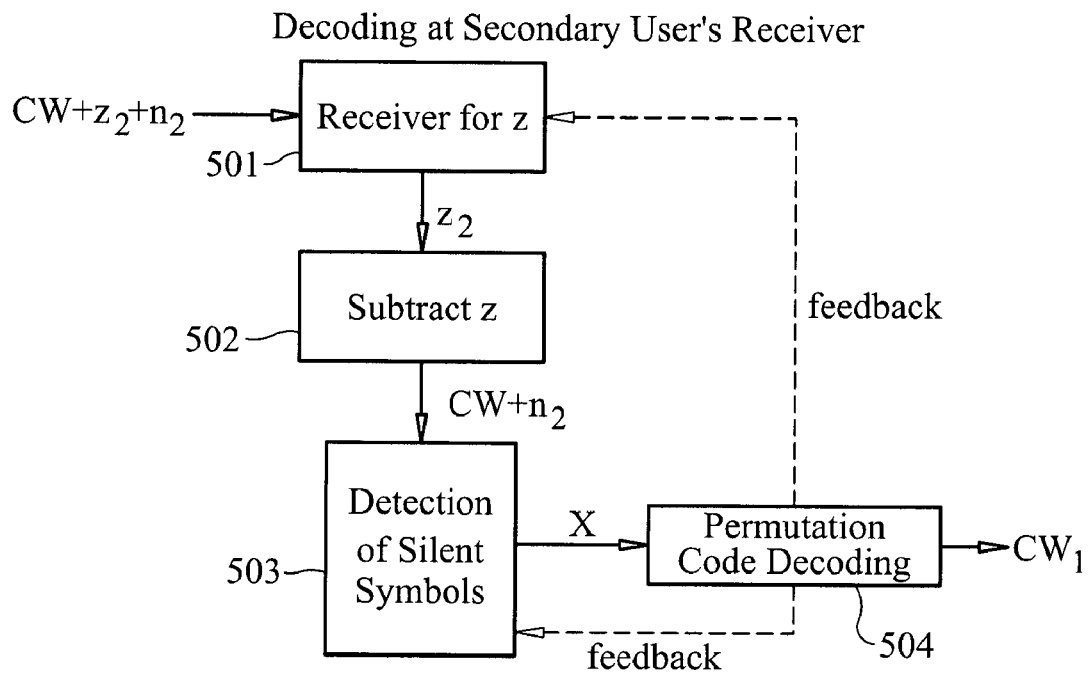
FIG. 5 illustrates a block diagram of high-level actions at a secondary user's receiver with an extra signal processing operation when $z_2$ can be decoded.

FIG. 5 depicts another case in which the CW term can be treated as interference and $z_2$ is decodable at the secondary receiver even when CW is treated as noise. Referring to FIG. 5, one can first decode $z_2$ using decoder 501, subtract from y using subtractor 502 to obtain $CW+n_2$ and proceed with the decoding process setting $z_2[i]=0$ and using the Delta-Dirac function as the pdf, i.e., $f(z_2=z)=\delta(z)$ (in other words probability that $z_2$ is zero is one and anything else is zero). That is, silent symbol detector 503 receives $CW+n_2$ and generates permutation code X. Decoder 504 performs permutation code decoding on X to generate $CW_1$. This method is most beneficial when a user has a much weaker reception from the base station for which it is the secondary user than from the base station for which it is the primary user.

Feedback may be used to notify other portions of the receiver where errors in decoding have occurred, such as those mentioned above.

The secondary user performs permutation code decoding for the input X, which is the only portion that carries useful information for the secondary user. In one embodiment, the permutation code decoding steps are as follows:

1. Find the number of 1's in vector X and store the value as k. Save n as the length of the vector X. Compute $$\Omega = \binom{n}{k} = \frac{n!}{k! \cdot (n-k)!}.$$

2. Parsing X from left to write, construct the set of 0 locations in X and denote this set as LOC. Since X has exactly (n−k) 0's, LOC is of size (n−k) with entries $loc_1$, $loc_2, \ldots, loc_{(n-k)}$ in increasing order with the property $0 \leq loc_1 < loc_2 < \ldots < loc_{n-k} \leq (n-1)$.

3. Compute index i using the following expression:

$$i = \binom{n}{k} - 1 - \sum_{j=1}^{(n-k)} \binom{n-1-loc_{n-k-i+1}}{i}$$

4. Assign index i to $rCW_{1,decimal}$.

5. Convert $rCW_{1,decimal}$ to base-2 form using $1+\lfloor \log_2 \Omega \rfloor$ bits. If the most significant bit is 0 and replacing it with 1 would have a decimal value smaller than or equal to $(\Omega-1)$, delete the most significant bit. Store the value in $rCW_1$ and label it as the decoded bits sent from the transmission queue of the secondary user at the base station. The least significant bit is the $1^{st}$ bit and the most significant bit is the M-th bit sent out from the transmission queue of the secondary user.

If X is decoded error-free, then $rCW_1$ is the same as $CW_1$ and the bits sent for the secondary user are successfully received. The secondary user concatenates all such received codewords and parses the bits to divide the bits into blocks and packets for further processing at the upper layers. Since there is a certain probability of error in the decoding process and some blocks/packets can be corrupted, in one embodiment, error detection codes, error correction codes, and/or erasure coding techniques typically should accompany this permutation code decoding.

Figure 6A:
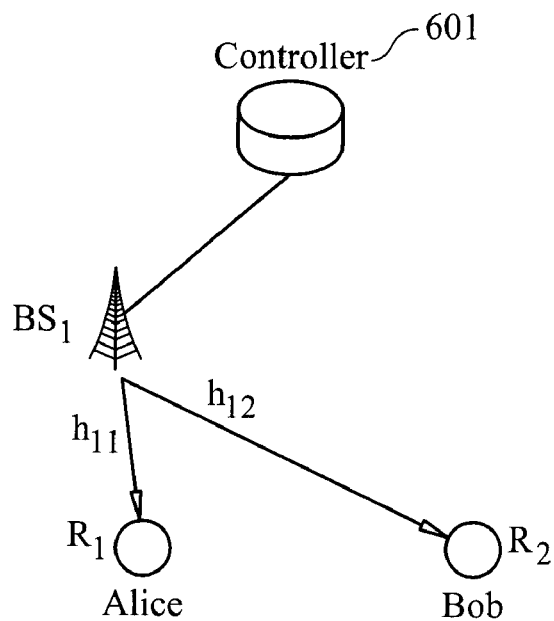
FIG. 6A illustrates a single cell scenario.
Figure 6B:
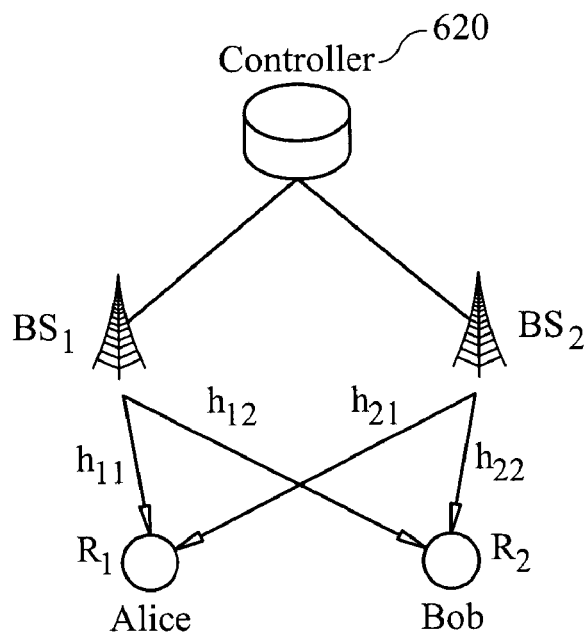
FIG. 6B illustrates a multiple-cell scenario.
Figure 6C:
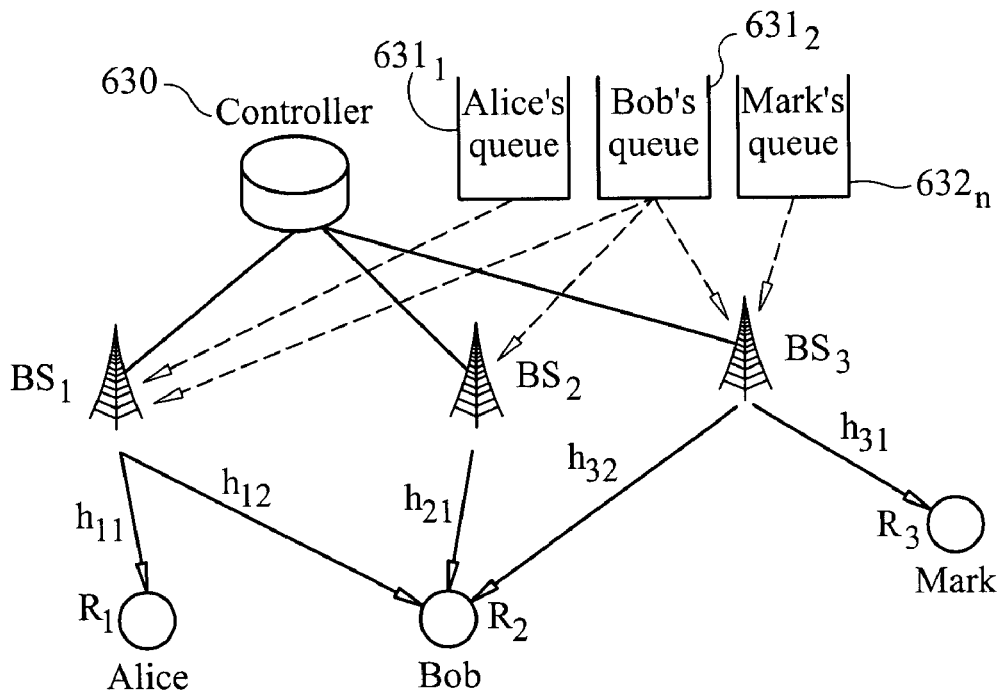
FIG. 6C illustrates a multiple-cell scenario and the coordination of resource allocation based on queue backlogs and channel state information.

From the wireless resource management point of view, embodiments of the invention are useful in many different scenarios some of which are depicted in FIGS. 6A through 6C. In FIG. 6A, the techniques disclosed herein are integrated with wireless resource allocation decisions in a given single cell. Referring to FIG. 6A, a base station BS, is shown communicably coupled to a controller 601 and wirelessly coupled to user terminals, Alice and Bob, with channel states $h_{11}$ and $h_{12}$ respectively, for sending bits $R_1$ and $R_2$ respectively. Every user is assigned a set of resource blocks as the primary users in a scheduling interval across time slots, bands, and spreading codes. The base station B, checks the resources that will be under-utilized given the current backlogs in user queues and the number of bits to be transmitted to each user in the next scheduling interval. Each such resource then is assigned to exactly one secondary user (note that the same user can be secondary users over multiple orthogonal resource blocks). The assignments to secondary users take into account many factors such as channel gain estimates over these set of resources and the queue backlogs.

Suppose there are L users in the system and the wireless resources are partitioned into L orthogonal resource blocks each assigned to users in a one to one fashion. This initial assignment can be done with respect to any fairness, prioritization, and/or optimization objective and it is independent from embodiments of the invention. Suppose a user u has a queue backlog of $W_u[i-1]$ bits before the i-th scheduling interval and over the resource block for which it is the primary user, $R_u[i]$ bits can be sent. Hence, after the resource assignment to primary users, each user will have a backlog of $B_u = \max \{0, W_u[i-1] - R_u[i]\}$. Accordingly, the base station creates a list U of users who have positive backlogs even after the primary resource assignment, i.e., u is in U if and only if $B_u > 0$. Suppose also that among L orthogonal resource blocks G of them are underutilized and have $\Omega_1, \ldots, \Omega_G$ as the number of permutation codes they can support leading to rates $r_1 = \log_2 \Omega_1, \ldots, r_G = \log_2 \Omega_G$. For each user u in U, let $p_{u,i}$ denote the successful decoding probability of permutation codes over research block i. This number typically depends on the channel gains from the base stations to the particular secondary user, the modulation/coding levels being used, noise and other interference power. $p_{u,i}$'s can be obtained through upper-bounds, approximations, simulations, empirical offline evaluations, and/or online learning. Given these definitions, one can use many different methods to assign underutilized resource blocks to individual users as described next.

In one method, resource assignment to individual backlogged users is done such that, after the assignment, maximum backlog across users is minimized. Each underutilized resource blocks are first placed in an assignment set A that has exactly G elements. For each user u in U, an ordered set $O_u$ is created whose elements are $r_i \cdot p_{u,i}$ in descending order. In each iteration, the method assigns one resource block from assignment set A as follows.

1. Pick the user with the most backlog $B_u$, e.g., $u^*$.
2. Take the resource block i∈A with the highest $r_i \cdot p_{u^*,i}$ for user $u^*$ and assign user $u^*$ as the secondary user for i.
3. Remove i from A, i.e., $A := A \setminus \{i\}$.
4. Update $B_{u^*}$ as $B_{u^*} := \max\{0, B_{u^*} - r_i \cdot p_{u^*,i}\}$ and continue with step 1 if $A \neq \{\}$, i.e., A is not an empty set.

The above allocation strategy guarantees stability provided that there exists a strategy that stabilizes the buffers (i.e., no buffer has an average backlog that grows in an unbounded fashion). Other methods with different objectives lead to different secondary user assignment strategies. One method that tries to maximize the throughput over the secondary use assigns each resource block to the user that has the maximum $r_i \cdot p_{u,i}$ among all users over this resource block. One can also apply proportional fair sharing (PFS) or exponential rules widely known in the literature to assign the resources with slight modifications. PFS metric or other metrics are computed per (user, resource block) pair and the one that maximizes the metric becomes the assignment pair, after which the metrics are recomputed with updated metrics over the unassigned resource blocks.

FIG. 6B depicts a multi-cell scenario where Bob is a primary user for transmissions from its own cell and secondary user for transmission from another cell. Referring to FIG. 6B, controller 620 is communicably coupled to base stations $BS_1$ and $BS_2$. Base stations $BS_1$ and $BS_2$ are communicably coupled wirelessly to user terminals such as Alice and Bob. For example, base station $BS_1$ wirelessly communicates with $R_1$ bits to using a channel with channel state $h_{11}$ and $R_2$ bits to Bob using a channel with channel state $h_{12}$. Also, base station BS$_2$ wirelessly communicates with R1 bits to Alice using a channel with channel state h$_{21}$ and R2 bits to Bob using a channel with channel state h$_{22}$. Unlike the scenario in FIG. 6A, the primary and secondary users of a given resource block do not belong to the same cell. If a resource reuse factor of 1 is in place, then in this scenario a user can be both a primary user and a secondary user for the same resource block, but with respect to distinct base stations.

FIG. 6C shows even a more general feasible application scenario in which the techniques described herein can be used. Referring to FIG. 6C, a controller node 630 behind the cell tower keep user queues 631$_1$-631$_M$ and manages all the resource allocation decisions at each cell. Referring to FIG. 6C, Alice and Mark have only assignments as primary users and they are under-utilizing their resource blocks. If their resource block is orthogonal, then Bob can simultaneously listen to both of them in a non-interfering fashion and become a secondary user for more than one resource block assigned at different locations. On top of it, Bob has its own primary resource assignment from his own base station (e.g., this typically means the base station with the strongest signal strength for Bob).

Figure 7:
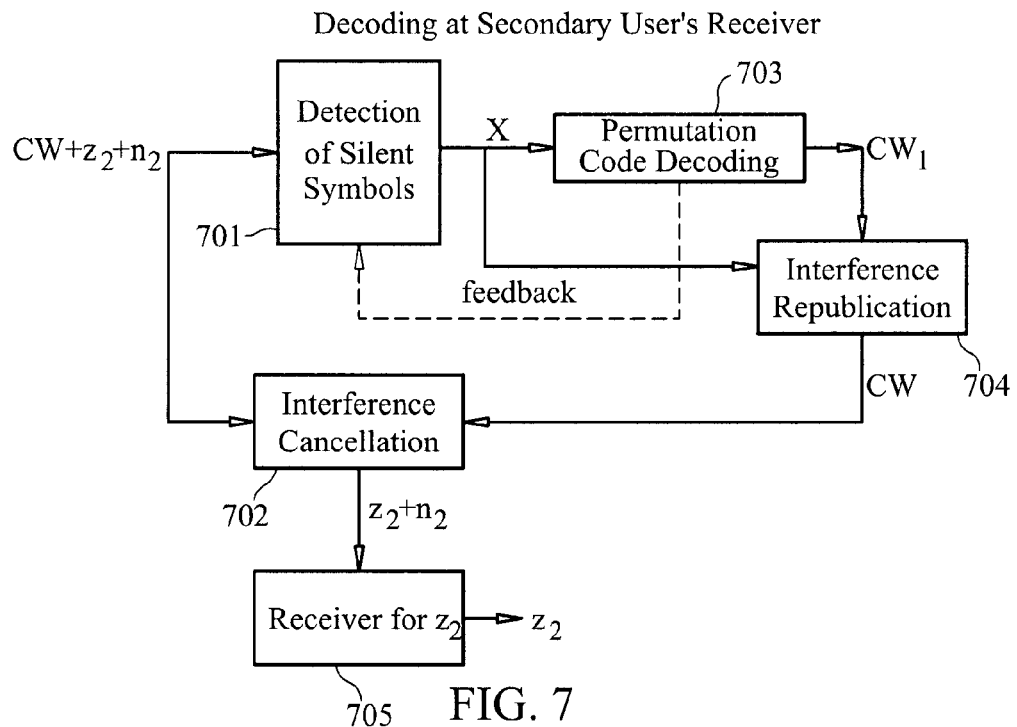
FIG. 7 illustrates decoding at a secondary user's receiver using permutation coding to learn about the interference and perform interference cancellation to boost up its own reliability or capacity over the same channel.

Another method disclosed herein is to use underutilized resources for interference cancellation purposes. FIG. 7 shows the decoding procedure for the case when a user is both a primary user and a secondary user for the same resource block assigned by different base stations forming an interference channel CW+z$_2$+n$_2$, where CW is the interference from the other cell, z$_2$ is the desired signal from user's base station, and n$_2$ is the interference. The interference channel CW+z$_2$+n$_2$ is input to both silent symbol detector 701 and interference canceller 702. The constructed permutation codeword X output from silent symbol detector 701 is input into permutation code decoder 703 and interference replicator 704. Permutation code decoder 703 performs permutation code decoding. The permutation coding as disclosed herein can be utilized as follows. The permutation code carries information about the symbols s$_1$, . . . , s$_k$ which are the actual interference terms (the rest of n–k symbols in CW are silent and causes no interference). Depending on the achievable rate of the permutation code, all or a subset of these k symbols can be encoded and embedded in CW. Then the decodable portion can be subtracted from CW+z$_2$+n$_2$ by interference canceller 702 mitigating and even (if enough capacity exists) completely eliminating the interference CW at the secondary user, thereby outputting z$_2$+n$_2$ to receiver 705, which generates z$_2$ therefrom. This technique can be used towards increasing the reliability or pushing the rate of z$_2$ to a higher bit rate to achieve higher capacity over the primary resource of the secondary user.

Figure 8:
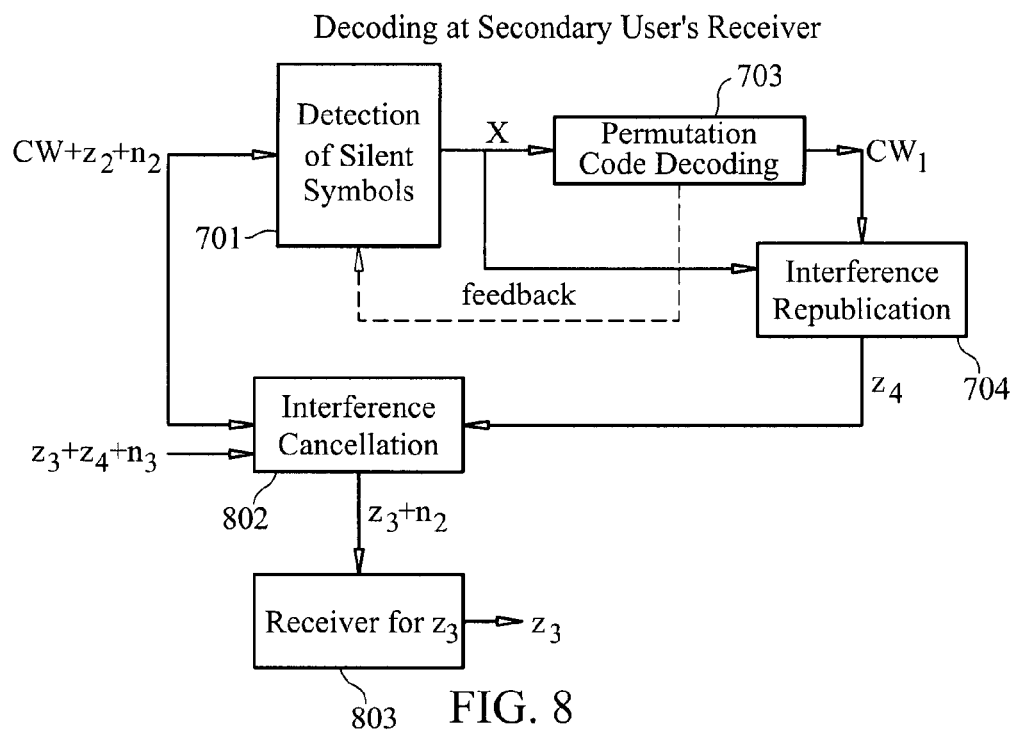
FIG. 8 illustrates decoding at a secondary user's receiver in which interference cancellation is used over the primary channel of the secondary user, where primary and secondary channels are orthogonal to each other.

FIG. 8 shows another interference cancellation scenario where the primary and secondary resource blocks at a receiver are on orthogonal resources. FIG. 8 includes elements interference cancellation 802 and receiver for Z$_3$ 803. Suppose receiver is the secondary user for the resource block over which CW+z$_2$+n$_2$ is delivered and it is the primary user for the resource block over which z$_3$+z$_4$+n$_3$ is sent, z$_2$ and z$_a$ are the interference terms while n$_2$ and n$_3$ are the noise terms over these resource blocks. CW carries the permutation code and z3 is the information sent to the receiver as the primary users. CW is used here to carry information about z$_4$ which is a transmission from another cell in the same system. Depending on the achievable rates as secondary user over one or multiple resource blocks, all or part of z$_4$ can be recovered and cancelled from the received signal using silent symbol detector 701, permutation code decoder 703 and interference replicator 704, as is done in FIG. 7. Thus, either z$_3$ can be decoded at a much higher reliability level or a higher capacity constellation/code combination can be utilized to increase the capacity over the primary channel allocation to this user.

Efficient Enumeration and De-Numeration of Distinct Permutations

Efficient enumeration and de-numeration of distinct permutations are possible due to the unique radix representation of any non-negative integer as stated by the following result:

Theorem 3.1: Every non-negative integer i has a unique l term representation $\{y_1 \ldots, y_l\}$ such that $$i = \binom{y1}{1} = \binom{y2}{2} = \ldots + \binom{y1}{l},$$

where $0 \leq y_1 < y_2 < \ldots < y_l$ (using the convention that $$\binom{n}{k} = 0 \text{ if } n < k)$$

This result is fundamental in uniquely indexing each permutation. Given a binary sequence of length n with exactly l=(n–k) zeros, $\{y1, \ldots, y_{(n-k)}\}$ correspond to the locations of 0's in increasing order for this binary sequence. Since distinct permutations of (n–k) zeros and k ones results in different $\{y_1, \ldots, y_{(n-k)}\}$ sequence, which according to the theorem above maps to a unique non-negative integer, each distinct permutation is uniquely enumerated. Conversely, given an index number $$i \in \left[0, \binom{n}{k} - 1\right]$$

and according to the same theorem, a unique expansion $\{y1, \ldots, y_{(n-k)}\}$ can be found that will provide the positions of zeros in a binary sequence of length n, hence a unique permutation. (To be more rigorous, it is shown that $y_{(n-k)} \leq$ (n–1). If $y_{(n-k)} > (n-1)$ were true, then $$i \geq \binom{n}{n-k} = \binom{n}{k}$$

contradicting with the assumption that $$i \in \left[0, \binom{n}{k} - 1\right])$$

The following enumeration and de-numeration algorithms are various embodiments.

---

Algorithm A1 [Enumeration Algorithm]

INPUT: Arbitrary permutation Π$_i$ of CW$_0$ = {11 . . . 10 . . . 0} of which the first k positions are all 1's and the remaining (n – k) positions are all 0's.

Algorithm A1 [Enumeration Algorithm]

OUTPUT: A unique index number $i \in \left[0, \binom{n}{k}-1\right]$ such that $i = j$ if and only if $\Pi_i = \Pi_j$.

STEP-1: $i = \sum_{j=1}^{(n-k)} \binom{\text{location}[0, j]}{j}$

The location[0, l] function refers to the position of the l-th zero in the binary sequence of length n and takes values in $\{0, 1, \ldots, (n-1)\}$.

Algorithm A2 [De-numeration Algorithm]

INPUT: An index number $i \in \left[0, \binom{n}{k}-1\right]$.

OUTPUT: A unique permutation $\Pi_i$ of $CW_0$ such that $\Pi_i = \Pi_j$ if and only if $i = j$.

STEP-1: Set $y_{(n-k)}$ as the greatest integer such that $\binom{y_{(n-k)}}{n-k} \leq i$. Then recursively compute $y_l$ as the greatest integer such that $\binom{y_l}{l} \leq i - \sum_{j=l+1}^{n-k}$ for $l = n-k-1, \ldots, 1$.

STEP-2: Set location[0, l] = $y_l$.

The following example shows enumeration and de-numeration over a short instance. Suppose $CW_0 = \{11111000\}$ with n=8 and k=5. We have $$\binom{8}{5} = 56$$

distinct permutations indexed from 0 to 55. For instance $\Pi = \{10111001\}$ corresponds to $y_1=1, y_2=5, y_3=6$ resulting in $$\binom{y1}{1} + \binom{y2}{2} + \binom{y3}{3} = \binom{1}{1} + \binom{5}{2} + \binom{6}{3} = 1 + 10 + 20 = 31.$$

Now, consider the index i=31 and find the corresponding permutation. The largest y3 that satisfy $$\binom{y1}{1} + \binom{y3}{3} < 3$$

is 6; the largest $y_2$ that satisfy $$\binom{y2}{2} < 31 - \binom{6}{3} = 11 = 2 \text{ is } 5;$$

and the largest y1 that satisfy $$\binom{y2}{1} < 31 - 20 - 10 = 1 \text{ is } 1.$$

Thus i=31 encodes to the permutation $\Pi = \{10111001\}$.

B. Noise-Free Case

Since $$\binom{n}{k} < 2^n, \Omega < 1$$

and even a small n value (e.g., n=10) can at most lead to 20% rate loss at the peak value. For moderate n values (e.g., n=100), the loss is less than 4%. Note that the curves for n=500 and n=1000 are almost on top of each other and using permutation codes longer than 500 has marginal impact on $\Omega$. For small n or k values, one can use look-up tables that enumerate the codewords and assign unique indices to distinct messages. For large n and k values however efficient methods such as provided in the previous section are needed.

The encoding algorithm that achieves the rate $$\Omega = \log_2\left[\binom{n}{k}\right] / n$$

in the absence of noise encompasses the following steps:

Algorithm A3 [Encoding Algorithm]

STEP-1: Remove L bits from the head of the primary user's backlogged data and map onto k symbols $\{s1, \ldots, sk\}$.

STEP-2: Remove M bits from the head of secondary user's backlogged data to form the codeword $CWB = \{b_1 b_2 \ldots b_M\}$. The unique index value i for this codeword is its decimal representation: $i = \sum_{l=1}^{M} b_l \cdot 2^{l-1}$.

Thus, i can be any integer in the interval $\left[0, \binom{n}{k}-1\right]$. M is picked as follows. If $\log_2\left[\binom{n}{k}\right]$ is integer, then $M = \log_2\left[\binom{n}{k}\right]$. Else if $\log_2\left[\binom{n}{k}\right]$ is not an integer and $\left\lceil\log_2\left[\binom{n}{k}\right]\right\rceil$ – th bit is 0, then $M = \left\lceil\log_2\left[\binom{n}{k}\right]\right\rceil$.

Else if $\log_2\left[\binom{n}{k}\right]$ is not an integer $\left\lceil\log_2\left[\binom{n}{k}\right]\right\rceil$ – th bit is 1 and $$\sum \left\lceil\log_2\left[\binom{n}{k}\right]\right\rceil b_i \cdot 2^{l-1} \leq \binom{n}{k} - 1, \text{ then } M = \left\lceil\log_2\left[\binom{n}{k}\right]\right\rceil.^3$$

STEP-3: Map i to a unique permutation $\Pi_i$ of the codeword $CW_0 = \{11 \ldots 10 \ldots 0\}$ of which the first k positions are all 1's and the remaining (n – k) positions are all 0's. Such a mapping can be done using Algorithm A2. Denote by location[0, j] the location of j-th zero and location[1, j] the location of j-th one.

STEP-4: Construct the codeword $CW = \{cwj\}$ such that $cw_{location[0,l]} = 0$ for $l = 1, \ldots, n - k$ (i.e., silent symbols correspond to zeros of the permutation code constructed in STEP-3) and -continued Algorithm A3 [Encoding Algorithm]

$cw_{location[1,l]} = s_l$ for $l = 1, \ldots, k$ (i.e., the symbols in their original transmission order are mapped onto the ones of the permutation code).

Algorithm A3 describes the encoding algorithm assuming that $s_j$'s are scalars. If $s_j$'s are complex numbers, one can apply the algorithm by first considering the real part of $s_j$'s and then the imaginary parts as the following example presents. Suppose n=8 and the symbols $s_j$ are QPSK symbols with mapping $s^{(0)}=e^{j\pi/4}\to 00$, $s^{(1)}=e^{j3\pi/4}\to 10$, $s^{(2)}=e^{j5\pi/4}=\to 11$, $s^{(3)}=e^{j7\pi/4}\to 01$. Let the primary user have 10 bits {0110001101} waiting in her buffer, which maps to the following 5 symbols $s=\{s^3,s^1,s^0,s^2,s^3\}$. Take the real part of s and form $s_{re}=\{s_{re}^{(3)},\bar{s}_{re}^{(1)},s_{re}^{(0)},s_{re}^{(2)},s_{re}^{(3)},\}$. Then apply the encoding algorithm by using $s^r$ first as the input from the primary user. Suppose the secondary user has 20 bits {10010100100010101111} in his queue with the leftmost bit as the first bit to transmit. Since $$\log_2\left[\binom{8}{5}\right] = 5.8074,$$

the sixth bit is 1 and $$\{100101\} \equiv 41 \leq \binom{8}{5} - 1 = 55,$$

M=6 and i=41 due to STEP-2 in A3. Using A2, location[0, 3]=7, location[0, 2]=4, location[0, 1]=0 and Γ={01110110}. Therefore, STEP-4 applied to $s_{re}$ with Π={01110110} generates the (real part of the) codeword $CW_{re}=\{0s_{re}^{(3)},s_{re}^{(1)}, s_{re}^{(0)},0s_{re}^{(2)},s_{re}^{(3)}0\}$.

Similarly, take the imaginary part of s and form $s_{im}=\{s_{im}^{(3)},s_{im}^{(1)},s_{im}^{(0)},s_{im}^{(2)},s_{im}^{(3)},\}$. Since 6 bits are removed from the secondary user's queue, there are 14 bits {00100010101111} backlogged. Because $$\log_2\left[\binom{8}{5}\right] = 5.8074$$

and the sixth bit is 0, M=5 and {00100} is removed from the buffer rendering i=4 due to STEP-2 in A3. Using A2, location [0, 3]=4, location[0, 2]=1, location[0, 1]=0 and Π={00110111}. Thus, STEP-4 applied to $s_{im}$ with Π={00110111} generates the (imaginary part of the) codeword $CW_{im}=\{0os_{im}^{(3)},s_{im}^{(1)},0s_{im}^{(0)},s_{im}^{(2)},s_{im}^{(3)},\}$. $CW_{re}$ and $CW_{im}$ are then transmitted in parallel as in-phase and quadrature components over orthogonal dimensions. During the silent symbol epochs, the transmitter keeps silent setting the power mask level to zero.

The decoding algorithm in each degree of freedom performs the following operations at the primary user's receiver. In the absence of noise and interference, using block fading assumption, primary user receives $y_1=h_1 \cdot CW$ and can perfectly identify the silent epochs whenever $h_{11}\neq 0$ in each orthogonal direction. The silent symbols are then discarded and the actual symbols received in a resource block are grouped together in the order they were received and the normal decoding operation is resumed.

The secondary user on the other hand receives $y_2=h_{12}\cdot CW$ and similar to the primary user's case can perfectly identify the silent epochs whenever $h_{12}\neq 0$ in each orthogonal direction. The following steps are involved in the decoding operation in each degree of freedom:

Algorithm A4 [Decoding Algorithm at the Secondary User]

STEP-1: Given $y_2$, identify the silent epochs and construct the binary permutation $\Pi_j$ of length n with k ones as an estimate of the actually used permutation $\Pi_i$ at the sender. If $\Pi_j \neq \Pi_i$, an error has occurred.

STEP-2: Run Algorithm A1 to find index $j \in \left[0, \binom{n}{k}-1\right]$.

STEP-3: Compute the binary representation of j in $M = \left[\log_2\left[\binom{n}{k}\right]\right]$ digits. If M-th most significant digit is zero, discard the M-th digit and pass the first (M − 1) bits as the decoded bits with the least significant bit as the first bit being received. If M-th digit is one, declare all M bits as the decoded bits again with the least significant bit as the first bit being received.

C. With Noise

In the presence of Gaussian noise and interference, the received signals at the primary and the secondary users become:

$$y_1=h_{11}\cdot CW+n_1;\ y_2=h_{12}\cdot CW+n_2,$$

where $n_i$ and $n_2$ are both assumed to be composed of zero-mean Gaussian noise terms with variance σ2. Both receivers are assumed to know their respective channel gains and the constellation being used perfectly. For the sake of simplicity let symbols $s_i$ be real scalars from the set S={−(2t−1)a, −(2t−3)a, . . . , −a, a, . . . , (2t−1)a} with cardinality |S|=2t. The parameter a is picked such that $E[s_i^2]=P$. Thus, SINR values at the primary and the secondary users are $\|h_{11}\|^2 P/\sigma^2, \|h_{12}\|^2 P/\sigma^2$, respectively.

Next, two different pairs of encoding and decoding strategies are presented. The first strategy (referred to as uncoded strategy) solely relies on making a correct hypothesis testing at each symbol epoch, whereas the second strategy (referred to as coded strategy) try to mimic some of the elements of the encoding strategy used by random permutations, albeit with finite length deterministic coding followed by suboptimum decoding.

1) Uncoded Strategy:

The base station constructs the codeword CW as in the noise-free case using Algorithm A3. At the receiver frontend, both primary and secondary users employ a symbol by symbol maximum likelihood (ML) hypothesis testing to figure out the permutation sequence Π used at the transmitter.

Let $H_0$ denote the hypothesis that a particular symbol epoch is silent and H1 denote the hypothesis that an actual transmission from S is occurred during the same epoch. Per symbol ML rule for hypothesis testing is given by: decide $H_0$ if and only if $Prob(y|H_0) \geq Prob(y|H_1)$. Here, we drop the subscripts from y and h as the channel models are the same for both receivers except for the SINR. Since $$Prob(y \mid H_0) = \frac{1}{\sqrt{2\pi\sigma^2}}\exp\left(-\frac{y^2}{\sigma^2}\right);$$

-continued $$Prob(y \mid H_1) = \frac{1}{2t} \sum \frac{1}{\sqrt{2\pi\sigma^2}} \exp\left[-\frac{(y-hs)^2}{\sigma^2}\right]$$

ML-rule becomes: Decide $H_0$ if and only if[4]

$$\frac{1}{2t} \sum_{l=1}^{t} = \left[\frac{-\|h\|^2(2l-1)^2 a^2}{2\sigma^2}\right] \quad (10)$$

$$\left\{\exp\left[-\frac{y\|h\|(2l-1)a}{\sigma^2}\right] + \exp\left[\frac{y\|h\|(2l-1)a}{\sigma^2}\right]\right\} \leq 1.$$

After symbol by symbol hypothesis testing, both the primary user and secondary user follow the steps of noise-free case. Therefore, if hypothesis testing fails in any of the n epochs, then a wrong permutation $\hat{\Pi}$ is decoded. This creates a false decoding operation at the secondary user (unless the device uses an error detection/correction capability in the permutation coding layer). After receiving full MAC packets, such errors can be detected by the CRC codes employed at the MAC layer of the secondary user. Wrong permutation decisions at the primary user, however, do not necessarily mean that the actual symbols cannot be recovered. To be more specific, if the false permutation leads to an error correctable by the channel code used for the primary user's payload, the primary user is not impacted. For instance, suppose $\Pi=\{01101\}$ and $\hat{\Pi}=\{10101\}$. Remember that in the noise-free decoding, the primary user simply discards the symbol epochs corresponding to zero locations in the permutation code and non-zero locations are assumed to preserve the original order of symbol generation. Hence, the decision $\hat{\Pi}=\{\mathbf{10101}\}$ would wipe out $s_1$, but $s_2$ and $s_3$ can still be decoded. If the channel code can recover from single symbol loss, then we can correct the false decision done at the hypothesis testing stage. Now consider the case where $\hat{\Pi}=\{00111\}$. Although only one position in the permutation code is erroneous, the other symbols become out of order creating a completely garbled input for the primary receiver's decoder.

Therefore, below, a failure at the hypothesis testing stage is assumed to be non-recoverable by the channel code used for the primary user's payload to handle the Gaussian noise and interference channel. In contrast, once the correct hypothesis testing has been obtained and primary user's symbols are correctly grouped together, channel decoding can resume as if no permutation coding was present in the first place from the primary user point of view. To compensate for errors in the hypothesis testing of both the primary and secondary receivers, we can add extra layers of error protection as discussed next.

2) Coded Strategy:

If the per symbol error rate is $p_e$, the block error rate $P_e$ becomes $1-(1-p_e)^n$ with independent losses. To improve the block error rate, one can focus on the permutation code design with errors to compensate for the per symbol hypothesis testing errors. Instead, in one embodiment, an error protection mechanism that makes use of earlier observations is used: (i) primary user does not need to know the permutation code being used. Instead, it can be treated just as a multiplicative noise factor as we did when utilizing the achievable capacity results through mutual information and the receiver can focus on the decoding of the original payload symbols; (ii) when the resource utilization is a<0.5, rate for the secondary user is not lower than when the resource utilization is in the interval [a, 1-a]. Hence, there is a safety margin within which applying lower rate channel coding than the channel capacity requires over the primary user symbols do not result in a rate penalty for the secondary user; and (iii) The efficiency of permutation codes is robust against the size of the permutation code. Accordingly, in one embodiment, the following algorithm is applied to add extra coding gain against errors in hypothesis testing stage.

---

Algorithm A5 [Encoding Algorithm with FEC Protection]

STEP-1: Divide a resource block of length n into m non-overlapping, adjacent, and equal size chunks. Each chunk consists of $\hat{n} = n/m$ symbols. Enumerate chunks from 1 to m.
STEP-2: Take $k_0$ source symbols $\{s_1, \ldots, s_{k0}\}$ of the primary user and expand it to n encoding symbols $\{\hat{s}_1, \ldots, \hat{s}_n\}$ using a $(k_0, n)$ forward error correction (FEC) code. Although the method can be used by any channel encoding/decoding strategy that can output n symbols, for the analysis purposes we assume that the FEC code is a maximum distance separable (MDS) code (i.e., its minimum distance is $d_{min} = n - k_0 + 1$). Divide n encoding symbols equally in their respective order into m groups, i.e., each group has $\hat{n}$ encoding symbols. Enumerate each group of symbols from 1 to m.
STEP-3: To achieve a target utilization level of $\theta = k/n$, allow $\hat{k} = k/m$ transmissions in each chunk. Thus, each chunk can enumerate up to $$\binom{\hat{n}}{\hat{k}}$$ distinct permutation codes.

STEP-4: For chunk numbers $\kappa = 1$ to $\hat{m} \leq m$:

1) Remove $M^l = \left\lfloor \log_2\left[\binom{\hat{n}}{\hat{k}}\right]\right\rfloor$ bits of secondary user and compute the corresponding index number i$\kappa$ according to STEP-2 of Algorithm A3.
Save $M^l$ bits in $B_\kappa$.
2) Compute the unique permutation $\Pi_{i\kappa}$ corresponding to the i$\kappa$ according to STEP-3 of Algorithm A3.
STEP-5: Concatenate $B_\kappa$'s from $\kappa = 1$ to $\hat{m}$. Thus, a source block of length $$\hat{m}\left\lfloor \log_2\left[\binom{\hat{n}}{\hat{k}}\right]\right\rfloor$$ is obtained or equivalently a source block of length $^\wedge$m with elements from Galois field GF(2q) where $q = \left\lfloor \log_2\left[\binom{\hat{n}}{\hat{k}}\right]\right\rfloor$ is obtained.
STEP-6: Expand the source block to length m using a systematic (m, $\hat{m}$) MDS code over field GF($2^q$). Assign each parity block to chunks $\kappa = \hat{m} + 1$ to m in the order they are generated. Generate the corresponding index numbers and permutations according to the operations in Algorithm A3.
STEP-7: Concatenate the permutation codes $\Pi_{i\kappa}$ from $\kappa = 1$ to m to form $\Pi^{(m)}$. Denote by location[0, j] the location of j-th zero and location[1, j] the location of j-th one for $\Pi^{(m)}$.
STEP-8: Construct the codeword CW =$\{cw_j\}$ such that $cw_{location[0,l]}$ = o for $l = 1, \ldots, n - k$ (i.e., silent symbols correspond to zeros of $\Pi^{(m)}$) and $cw_{location[1,l]} = \hat{s}l$ for $l = 1, \ldots, k$. In other words, the permutation code erases the encoding symbols generated for the primary user in a unique pattern.

---

Note that $\Pi^{(m)}$ is generated with respect to the secondary user's payload, therefore this erasure operation at the transmitter site will lead to a multiplicative non-Gaussian noise independent of the primary user information. There are couple of intricate points worth to emphasize here. Firstly, at the expense of abuse of notation $\{s_1, \ldots, s_{k0}\}$ denotes the symbols before the channel coding unlike the case in uncoded strategy where $\{s_1, \ldots, s_k\}$ denoted the symbols after the channel coding. In both cases, k denotes the actual number of transmissions from the sender side and the notation $k_0$ is introduced in the coded case to differentiate the actual number of payload symbols for the primary user. In the coded strategy, depending on the value of $k_0$ and n, the target utilization $k \geq k_0$ impacts the decoding performance as it will be more rigorously stated in the next section. Secondly, two different channel codes are applied; one for the primary user at STEP-2 and one for the secondary user at STEP-6. The code used for the primary user helps in bypassing the hypothesis testing stage completely. The code used for the secondary user can be though of boosting the performance of the hypothesis testing stage that is needed to perform permutation code decoding. Thirdly, Algorithm A5 makes a rate-error performance tradeoff6 through the parameters k, m, and $\hat{m}$:

$$r_B \frac{\hat{m} \cdot \left\lfloor \log_2 \left[ \binom{\hat{n}}{\hat{k}} \right] \right\rfloor}{n} = \gamma_1 \cdot \gamma_{2 \cdot \Omega},$$

where $$\gamma_1 = \frac{\hat{m}}{m}$$

is the coding rate for the secondary user, $$\gamma 2 == \frac{\hat{m} \cdot \left\lfloor \log_2 \left[ \binom{\hat{n}}{\hat{k}} \right] \right\rfloor}{\log_2[k_0^n]}$$

is the rate penalty paid (or the award gained) by target utilization $\theta = k/n$ and dividing the resource block into smaller chunks, and $\Omega$ is the permutation code rate of uncoded strategy. Unlike $y_1$, $y_2$ is not necessarily less than or equal to 1 when $k_0 < n/2$ and m is small.

Unlike the uncoded strategy, the primary user skips the hypothesis testing stage in the decoding operations. The receiver directly attempts to perform channel decoding as if no permutation coding were present. The permutation coding simply acts as another (non-Gaussian) error source.

On the other hand, the secondary user first performs per-symbol hypothesis testing as before. Then, each chunk is labeled as erasure or received using the implicit error detection capability of the permutation codes: each chunk must have $(\hat{n}-\hat{k})$ non-silent symbols. Therefore, one can readily label a chunk as erasure if the number of silent symbols detected is not equal to $(\hat{n}-\hat{k})$ in a given chunk. Otherwise, it is labeled as received. Error detection is in err if and only if a chunk is labeled as received but the permutation was flipped to another valid permutation. Once each chunk is labeled, decoding operation proceeds with the knowledge of erasures. Each chunk first decoded into $M^1$ bits using permutation decoding. Since an MDS code is employed with minimum distance $dmin = m-\hat{m}+1$, e erasures and t errors can be corrected as long as $2t+e < d_{min}$ [9]. Hence, FEC decoding generates $\hat{m}$ symbols of length $M^1$ bits. $\hat{m} \cdot M^1$ bits are then passed to the MAC layer of the secondary user for further defragmentation, packet reconstruction, and CRC validation.

An Example of a Base Station Embodiment

Figure 9:
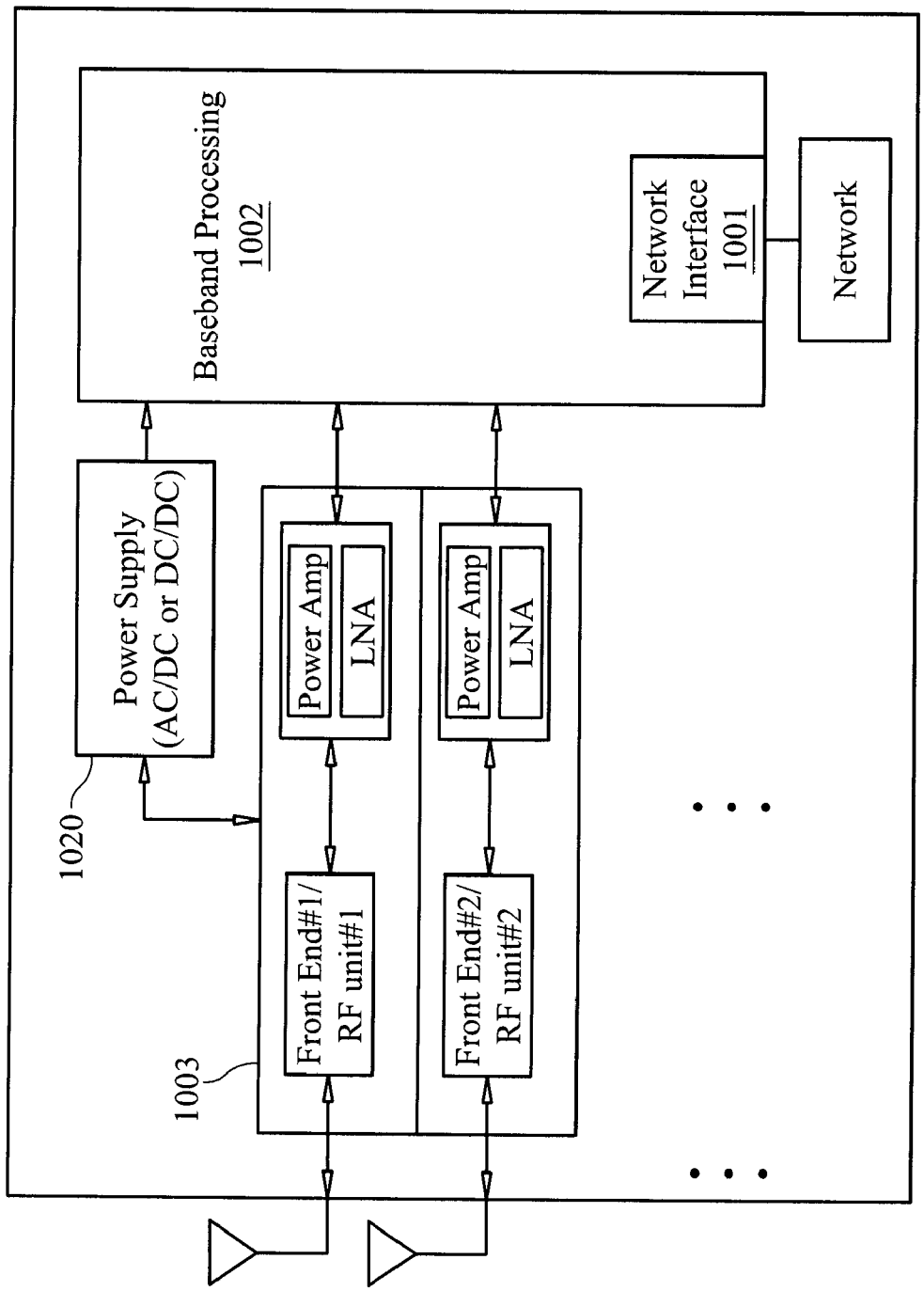
FIG. 9 illustrates a block diagram of one embodiment of a base station.

FIG. 9 is a block diagram of one embodiment of a base station that includes a power supply 1020, network interface 1001, baseband processing 1002 and front and/RF unit signal block 1003. Baseband processing 1002 encodes the signals for transmission, including the encoding baseband above. Signal block 1003 includes the upconverter to upconvert signals at intermediate frequency up to a frequency from transmission. Signal block 1003 also includes down converter to down convert received signals to intermediate frequency, which are input to baseband processing 1002 for decoding.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use in a cellular system in which a channel allocated to a primary user is underutilized at times, the method comprising:
    creating a unique 0-1 valued permutation code to transmit bits of a secondary user on a channel of the primary user;
    creating one or more codewords based on a first set of symbols to be transmitted for the primary user and the permutation code; and
    transmitting the one or more codewords on the channel.

2. The method defined in claim 1 further comprising applying channel coding to a second set of symbols to be transmitted to the primary user on the channel to create the first set of symbols, and further wherein creating the one or more codewords comprises applying symbol by symbol multiplication to the first set of symbols and the permutation code.

3. The method defined in claim 1 further comprising inserting silent symbols in between at least some of the symbols to be transmitted for the primary user.

4. The method defined in claim 3 wherein the bits are modulated into a unique permutation of a 0-1 vector with k 1's and (n−k) 0's, where k is the number of symbols to be transmitted for the primary user and n is a number of symbols being transmitted on the channel.

5. The method defined in claim 3, further comprising:
    processing the one or more codewords using a decoder at the secondary user by:
        locating silent symbol locations to find the permutation code; and
        inverting the permutation code to recover the bits of the secondary user.

6. The method defined in claim 3, further comprising:
    processing the one or more codewords using a decoder at the primary user by:
        locating silent symbol locations;
        discarding located silent symbols; and
        decoding symbols remaining after discarding the located silent symbols from the one or more codewords.

7. The method defined in claim 1 further comprising processing the one or more codewords using a decoder at the primary user by directly decoding the one or more codewords while treating the permutation code as multiplicative noise.

8. The method defined in claim 1 further comprising:
    dividing the bits of the secondary user into a plurality of chunks;
    applying channel coding to a number of chunks in the plurality of chunks to create encoded chunks; and
    applying the permutation code to each of the encoded chunks; and further wherein creating one or more codewords comprises applying concatenation to combine permutation codes associated with each of the encoded chunks.

9. A cellular system comprising:
a primary user;
a secondary user;
a base station communicably coupled to the primary and secondary users, and having:
  a controller to allocate a channel to the primary user that is underutilized by the primary user at times,
  a memory to store bits to be transmitted,
  a processor coupled to the memory to process the bits by creating a unique permutation code to transmit bits of the secondary user on the channel of the primary user, creating one or more codewords based on a first set of symbols to be transmitted for the primary user and the permutation code, and transmitting the one or more codewords on the channel.

10. The system defined in claim 9 wherein the processor is operable to apply channel coding to a second set of symbols to be transmitted to the primary user on the channel to create the first set of symbols, and the processor is operate to create the one or more codewords by applying symbol by symbol multiplication to the first set of symbols and the permutation code.

11. The system defined in claim 9 wherein the processor is operable to insert silent symbols in between at least some of the symbols to be transmitted for the primary user.

12. The system defined in claim 11 wherein the bits are modulated into a unique permutation of a 0-1 vector with k 1's and (n–k) 0's, where k is the number of symbols to be transmitted for the primary user and n is a number of symbols being transmitted on the channel.

13. The system defined in claim 11, wherein the secondary user is operable to process the one or more codewords using a decoder at the secondary user by:
  locating silent symbol locations to find the permutation code; and
  inverting the permutation code to recover the bits of the secondary user.

14. The system defined in claim 11, wherein the primary user is operable to process the one or more codewords using a decoder at the primary user by:
  locating silent symbol locations;
  discarding located silent symbols; and
  decoding symbols remaining after discarding the located silent symbols from the one or more codewords.

15. The system defined in claim 9 wherein the primary user is operable to process the one or more codewords using a decoder at the primary user by directly decoding the one or more codewords while treating the permutation code as multiplicative noise.

16. The system defined in claim 9 wherein the processor is operable to:
  divide the bits of the secondary user into a plurality of chunks;
  apply channel coding to a number of chunks in the plurality of chunks to create encoded chunks; and
  apply the permutation code to each of the encoded chunks;
  and further wherein creating one or more codewords comprises applying concatenation to combine permutation codes associated with each of the encoded chunks.

17. A base station for use in a cellular system having primary and secondary users, the base station comprising:
  a controller to allocate a channel to the primary user that is underutilized by the primary user at times,
  a memory to store bits to be transmitted,
  a processor coupled to the memory to process the bits by creating a unique permutation code to transmit bits of the secondary user on the channel of the primary user, creating one or more codewords based on a first set of symbols to be transmitted for the primary user and the permutation code, and transmitting the one or more codewords on the channel.

18. A non-transitory computer readable storage medium having electronic instructions stored thereupon which when executed by a processor of a cellular system, the electronic instructions cause the cellular system to perform operations for use in the cellular system in which a channel allocated to a primary user is underutilized at times, wherein the operations include:
  creating a unique 0-1 valued permutation code to transmit bits of a secondary user on a channel of the primary user;
  creating one or more codewords based on a first set of symbols to be transmitted for the primary user and the permutation code; and
  transmitting the one or more codewords on the channel.

19. A device for use in a wireless communication system, the device comprising:
  a silent symbol detector to detect silent symbol locations to find a permutation code; and
  a permutation code decoder operable to receive the permutation code to recover bits by inverting the permutation code.

* * * * *